United States Patent [19]
Koyama et al.

[11] 3,963,445
[45] June 15, 1976

[54] EXHAUST EMISSION CONTROL DEVICE OF THE CATALYST TYPE

[75] Inventors: Toshihiko Koyama; Masahiro Nanri, both of Kariya; Kazuma Matsui, Toyota; Shigeo Hoshino, Kariya, all of Japan

[73] Assignees: Nippondenso Co., Ltd., Kariya; Nippon Soken, Inc., Nishio, both of Japan

[22] Filed: Aug. 3, 1973

[21] Appl. No.: 385,339

[30] Foreign Application Priority Data
Aug. 22, 1972 Japan.............................. 47-83941

[52] U.S. Cl............................. 23/288 FC; 138/108; 138/112
[51] Int. Cl.²...................... F01N 3/15; B01J 8/00
[58] Field of Search................... 23/288 F, 288 FC; 60/299; 138/108, 112

[56] References Cited
UNITED STATES PATENTS

| | | | |
|---|---|---|---|
| 3,404,965 | 10/1968 | Shiller | 23/288 F |
| 3,441,381 | 4/1969 | Keith et al. | 23/288 F |
| 3,441,382 | 4/1969 | Keith et al. | 23/288 F |
| 3,597,165 | 8/1971 | Keith et al. | 23/288 F |
| 3,692,497 | 9/1972 | Keith et al. | 23/288 F |
| 3,771,967 | 11/1973 | Nowak | 23/288 F |
| 3,798,006 | 3/1974 | Balluff | 23/288 F |
| 3,801,289 | 4/1974 | Wiley | 23/288 FC |
| 3,841,842 | 10/1974 | Wiley | 23/288 FC |
| 3,852,042 | 12/1974 | Wagner | 23/288 FC |

*Primary Examiner*—Barry S. Richman
*Attorney, Agent, or Firm*—Cushman, Darby & Cushman

[57] ABSTRACT

A device comprising exhaust leak preventing means made of a flexible material and mounted between a wall of a container and a catalyst element of a honeycomb structure disposed in the container to prevent leak of exhausts from an internal combustion engine mounted on a motor vehicle or the like through a gap between the container wall and the catalyst element before the exhausts are purified. Support means made of pliable metal may be used for holding the exhaust leak preventing means in place and keeping the latter from being dislodged from its position when the container is subjected to forces of impact or vibration.

2 Claims, 3 Drawing Figures

EXHAUST EMISSION CONTROL DEVICE OF THE CATALYST TYPE

BACKGROUND OF THE INVENTION

1. FIELD OF THE INVENTION

This invention relates to exhaust emission control devices of the catalyst type for internal combustion engines mounted on motor vehicles or the like, and more particularly it is concerned with an exhaust emission control device of the type described which comprises a novel catalyst element container and catalyst element holder combination.

2. DESCRIPTION OF THE PRIOR ART

In one type of devices known in the art for removing noxious components of exhausts vented to atmosphere from internal combustion engines mounted on motor vehicles or the like, such as carbon monoxide, unburned hydrocarbons and oxides of nitrogen, a catalyst has been used. Many exhaust emission control devices of the catalyst type employ a catalyst in particulate form. Proposals have been made to use, in place of the catalyst of the particulate form, a catalyst element comprising a catalyst composition carried by a carrier (the carrier is generally of a honeycomb structure in many cases) made of ceramic in one piece and formed therein with a plurality of exhaust passages.

The catalyst element of the honeycomb structure has, however, the disadvantage of being susceptible to forces of impact and vibration. In order to obviate this problem, it has been proposed to use a metallic woven fabric 3 of high stability which is mounted between a wall of a container 1 and the catalyst element 4 as shown in FIG. 1. It has also been proposed to fit a ring 2 over each of opposite ends of the catalyst element 4 and seal it by closing a gap between the wall of the container and the catalyst element in which metallic woven fabric 3 is mounted, in order to preclude leak of exhausts through the gap to an outlet port 1b after being introduced into the container through an inlet port 1a.

Some disadvantages are associated with the aforementioned devices of the prior art. There are differences in thermal expansivity between the container 1 or rings 2 and the catalyst element 4, so that a gap tends to be formed between each of the rings 2 and the catalyst element 4. Thus, exhausts not purified yet may leak through the gaps, pass through a gap in which the metallic woven fabric 3 is mounted and be discharged through the outlet port 1b. When the temperature in the container is elevated, the resilience of the metallic woven fabric 3 tends to be reduced, so that when the container 1 is subjected to forces of impact or vibration the catalyst element 4 may strike against the rings 2, thereby damaging the catalyst element.

SUMMARY OF THE INVENTION

This invention obviates the aforementioned disadvantages of the prior art. Accordingly, the invention has as its object the provision of an exhaust emission control device of the catalyst type comprising a novel catalyst element container and catalyst element holder combination in which no exhaust leak prevention rings are used to preclude damage which might otherwise be caused on the catalyst element when it strikes against the rings, and in which a seal member made of ceramic fibers or other flexible material is wound on the catalyst element to preclude leak of exhausts not purified yet through a gap between the wall of the container and the catalyst element having a metallic woven fabric mounted therein.

According to the invention, there is provided an exhaust emission control device of the catalyst type for internal combustion engines mounted on motor vehicles or the like comprising a container, a catalyst element comprising a catalyst composition carried by a carrier of a honeycomb structure formed therein with a plurality of exhaust passages and disposed in the container, a metallic woven fabric mounted between a wall of the container and the catalyst element, and exhaust leak preventing means made of a flexible material and mounted in a gap between the container wall and the catalyst element to prevent leak of exhausts through such gap.

DESCRIPTION OF A PREFERRED EMBODIMENT

Figure 1:
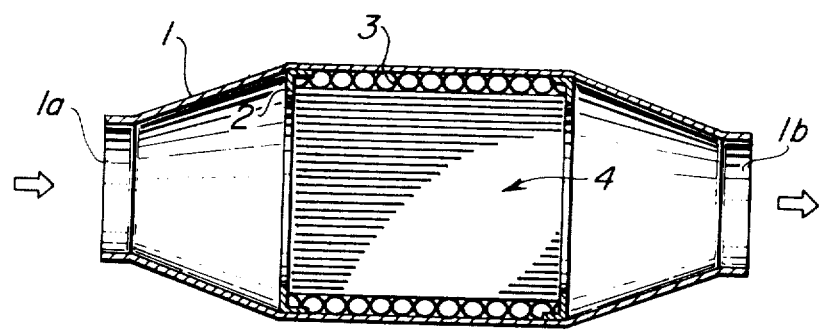
FIG. 1 is a vertical sectional view of an exhaust emission control device of the catalyst type of the prior art.
Figure 2:
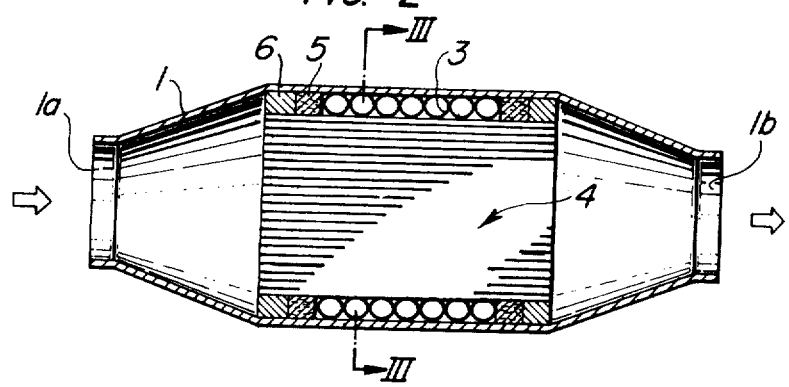
FIG. 2 is a vertical sectional view of the exhaust emission control device of the catalyst type comprising one embodiment of the invention.
Figure 3:
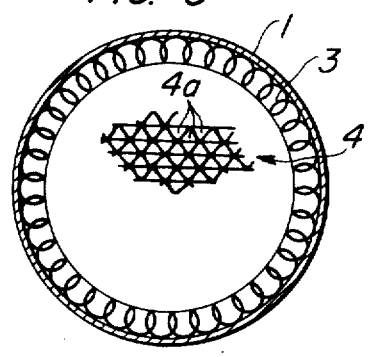
FIG. 3 is a sectional view taken along the line III—III of FIG. 2.

A preferred embodiment of the invention will now be described with reference to FIG. 2 and FIG. 3. In FIG. 2, 1 designates a container in which a catalyst element 4 is disposed. The container 1 is formed at its front portion (leftward portion in FIG. 2) with an exhaust inlet port 1a at its rear portion (rightward portion in FIG. 2) with an exhaust outlet port 1b. The catalyst element 4 comprises a catalyst component carried by a carrier of a honeycomb structure formed therein with a plurality of passages 4a disposed parallel to the flow of exhausts.

3 designates a stable metallic woven fabric mounted between a wall of the container 1 and the catalyst element 4 to preclude damage which might otherwise be caused on the catalyst element 4 by forces of impact or vibration exerted on the container. 5 designates exhaust leak preventing means according to the invention made of a flexible material, such as ceramic fibers or stainless steel in fiber form, and mounted in a gap between a wall of the container 1 and the catalyst element 4. 6 designates support means made of pliable metal in the form of a bundle of stainless steel wires for holding the exhaust leak preventing means 5 in place and keeping it from being dislodged from its position when the container 1 is subjected to forces of impact or vibration.

In operation, exhausts are introduced into the device constructed as aforementioned through the inlet port 1a as indicated by a bold arrow in FIG. 2, move through passages 4a in the catalyst element 4, and are discharged through the outlet port 1b. When the container 1 is subjected to forces of impact or vibration, the forces are absorbed by the metallic woven fabric 3 and the catalyst element 4 is protected from these forces. The exhaust leak preventing means 5 is effective to keep exhausts not purified yet from flowing out through a gap between the wall of the container 1 and the catalyst element 4. The support means 6 is effective to keep the exhaust leak preventing means 5 from being dislodged from its position when the container is subjected to forces of impact or vibration.

From the foregoing description, it will be appreciated that the exhaust emission control device of the catalyst type according to the invention is characterized by the exhaust leak preventing means made of a flexible material, such as ceramic fibers or stainless steel in fiber form, and mounted between the wall of the container and the catalyst element in the container to preclude leak of exhausts through the gap between the container wall and the catalyst element. By virtue of this arrangement, leak of exhausts through the gap between the container wall and the catalyst element can be prevented, even if a great difference in expansion is produced between the container wall and the catalyst element when the temperature in the container is elevated. The provision of the support means 6 made of pliable metal is effective to keep the exhaust leak preventing means from being disloged from its position when subjected to forces of impact or vibration, and to positively prevent leak of exhausts not purified yet by the device.

While the form of device herein described constitutes a preferred embodiment of the invention, it is to be understood that the invention is not limited to this precise form of the device, and that changes may be made therein without departing from the scope of the invention which is defined in the appended claims.

What we claim is:

1. An exhaust emission control device of the catalyst type for internal combustion engines mounted on motor vehicles comprising, a container having an exhaust inlet and outlet port, a catalyst element of honeycomb carrier having a catalyst component thereon and a plurality of axially disposed exhaust passages therein and extending between one end and an opposite end of said carrier, said catalyst element being disposed in said container for purifying exhaust gases flowing through said container, a metallic woven fabric disposed in an annular space between said container and said catalyst element and extending longitudinally between said ends of said carrier, the longitudinal ends of said fabric being short of the ends of said carrier, for absorbing the forces of impact or vibration exerted on said container, and exhaust leak preventing means made of a fibrous flexible ceramic material and mounted between said container and catalyst element at the opposite ends of said metallic woven fabric for sealing said annular space, each said leak preventing means extending into said annular space and being longitudinally spaced from said preventing means at the other end by said metallic woven fabric for preventing leak of the exhaust gases which might otherwise flow through a gap between said container and catalyst element.

2. A device according to claim 1, further comprising support means made of pliable metal and disposed in said annular space between said container and catalyst element at opposite outer ends of said exhaust leak preventing means for holding said leak preventing means in place.

* * * * *